June 30, 1942. F. S. DUNLEAVEY 2,288,157
DRY ELECTROLYTIC CAPACITOR AND SPACING MEANS THEREFOR
Filed July 3, 1940
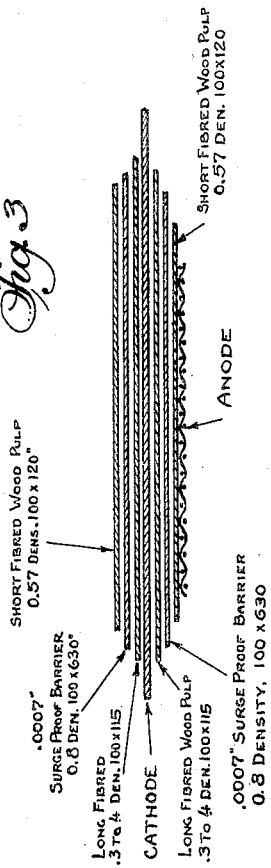
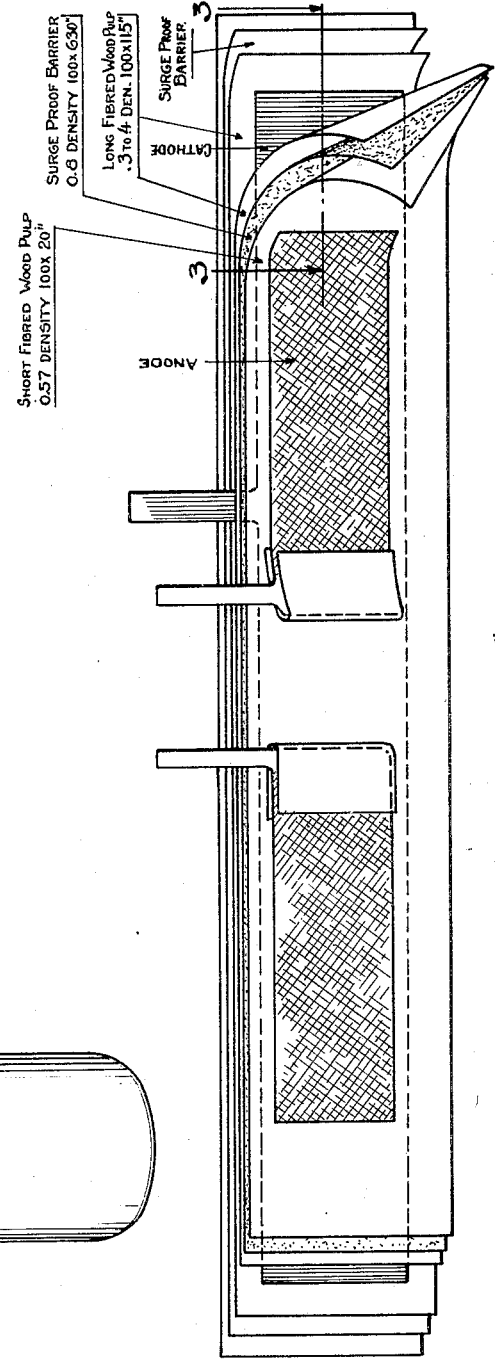
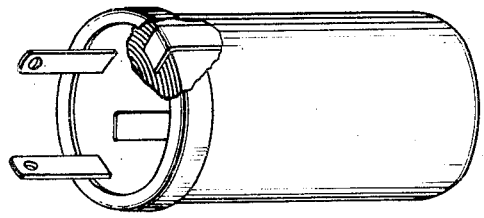
INVENTOR.
Frank S. Dunleavey
BY Parkinson + Lane Attys.
Witness:
Chas. R. Koursh.

Patented June 30, 1942

2,288,157

UNITED STATES PATENT OFFICE 2,288,157

DRY ELECTROLYTIC CAPACITOR AND SPACING MEANS THEREFOR

Frank S. Dunleavey, Fort Wayne, Ind., assignor to The Magnavox Company, Inc., Fort Wayne, Ind., a corporation of Indiana Application July 3, 1940, Serial No. 343,835

2 Claims. (Cl. 175—315)

This invention relates to dry electrolytic capacitors for use in radio receivers and similar apparatus, and is particularly directed to the provision of a new and novel spacing means for such capacitors.

Referring to the drawing:

Figure 1 shows a type of condenser exemplifying the invention;

Figure 2 is a perspective view showing the anode and cathode and surge proof spacing means in coordinated relation before winding, and Figure 3 is an enlarged fragmentary sectional view of the spacing means, cathode and anode.

In Figure 1 the roll is shown in a metal can or container. The lead which comes out of the roll and which is bent down into engagement with the can, is the lead from the cathode to the can.

In one application of the invention as shown in Figures 1 and 2, there are two leads which are connected to the anodes that are adapted for connection to outside terminals, and a third lead which may be connected to an additional ground. The embodiment shown is one commercial adaptation of this invention which includes a double condenser, although a single condenser may be employed if desired.

The invention finds application to all types of dry electrolytic capacitors, but is particularly advantageous for use in those capacitors employing anodes consisting in a fabric base with finely divided aluminum surfaces.

All dry electrolytic capacitors employ a spacing means, which is usually highly absorbent, to hold the electrolyte between the anode and cathode. Such spacers have commonly consisted of purified cotton gauze (bandage material) or of paper.

The dry electrolytic's predecessor, the wet electrolytic capacitor, because of its wide spacing between anode and cathode and very fluid electrolyte, would stand considerable over-voltage, that is, voltage above its normal formation or rated voltage, as the surge current that passed through the capacitor under such conditions electrolyzed the water from the electrolyte forming gas, but the spacing was always sufficiently adequate so that these gas bubbles were big enough to float to the surface and raise the pressure above the electrolyte in the container. Vents were usually provided in the capacitor case so that such accumulating pressures would naturally be dissipated thus avoiding explosions or other hazards. Thus, there was no danger, in the wet electrolytic, of the gases formed mixing in the electrolyte under the influence of the electric field and causing a disrupting arc and short circuit of the capacitor terminals.

In dry electrolytic capacitors, the electrolyte is much more viscous and therefore does not allow gas bubbles to leak out of the capacitor roll and raise the gas pressure in the space between the roll and the case. This increases the danger of break-down or arcing in electrolytic capacitors of the dry type. A further difficulty has arisen from the employment of a gauze spacer to hold the viscous electrolyte in position, the weave of this material further impeding the progress of gas bubbles coming out tangential to the surface of the anode. The result is that minute bubbles of gas formed at the anode surface due to over-voltage and scintillation remain close to the anode surface, forming bubbles of increasing size until the field across the bubble is sufficient to cause break-down of the gas pocket so formed. When this occurs, then the break-down allows a disrupting arc current to flow through the structure at that point causing volitization of the metal in the anode, a loss of the insulating quality of the film, and carbonizing the electrolyte and spacer means at that point. Even when a double thickness of gauze was used in the spacing means, satisfactory performance on surge tests proved to be impossible of attainment.

In using dry electrolytic capacitors, it was necessary that the capacitors be chosen to withstand the peak voltage that would be applied to it during the period when the apparatus in which it was used was first turned on and which voltage, as is well known, is usually much higher than the normal operating voltage of such apparatus. Then the dry electrolytic capacitor, particularly of the gauze type, was picked on the basis of the peak voltage to which it was likely to be subjected and not on the basis of the working voltage that the capacitor would have to work at once conditions had reached equilibrium. In many cases this required voltages well beyond the working voltages by as much as 200 or 300 volts.

When paper was introduced as a spacing means, it was found that the breakdown voltage of the capacitor was increased somewhat, but the dry electrolytic capacitor, even with its paper spacing means and either plain or etched electrodes, still had to be selected on the basis of the peak surge voltage condition rather than on the basis of its continuous working voltage.

Attempts were then made to overcome the above disadvantages by impregnating the paper with cellulose acetate plasticized with an ethylene glycol base electrolyte and while the resulting units were more or less surge-proof, it proved at least difficult, if not impossible, to properly control the mixture or the uniformity of the coating with the result that uniform characteristics in the capacitor could not be obtained.

One of the objects of the present invention is to provide a capacitor structure which will be most economical from the point of view of material, which is one of the larger items of expense in the capacitor, and allow for its more efficient use by providing a spacing means which is capable of safely controlling the surge voltage likely to be encountered in apparatus in which it is employed, and such, for example, as the surge voltage present during the normal warming-up cycles in radio receiving apparatus.

Another object of the invention is to provide a capacitor which can be designed on the basis of the normal continuous working voltage of apparatus in which it is to be used rather than on the peak surge voltage conditions of such apparatus as have been necessary in prior art practice.

With the above and other objects in view, the spacing means of this invention briefly stated consists of a triple paper layer construction wherein one of the layers is a unique and more dense absorbent sheet of paper as compared with papers previously used in prior art capacitors. The characteristics which this sheet must possess are:

High density—namely, approximately 0.8—as compared with most other commonly used electrolytic grade spacer papers which usually have a density within the range of 0.3 to 0.6. It is preferred to employ a linen base capacitor grade tissue and one which is free or practically so of water soluble chlorides, sulphates, nitrates, irons, or other salts, or conducting particles. The porosity of this sheet should approximate 100 cubic centimeters in 630 seconds. It is furthermore preferred that the paper be uncalendered, though calendered paper can be used with equally good results.

The two outer layers of the spacing means which are located on each side of the above dense sheet can be the conventional electrolytic capacitor tissues and may have densities as low as 0.3 or as high as 0.6 without seriously effecting the surge proof characteristics of such capacitor structure for a normal radio power supply application, for example.

In the preferred embodiment of the invention, the surge proof barrier is an uncalendered linen base capacitor tissue, .0007" thick having about 0.8 density and a porosity of 100 cc. in 630 seconds, as above, in combination on one side of the barrier with a matted, short-fibred sheet of wood pulp paper having a density of 0.57; a thickness of .0002", and a porosity of 100 cc. in 120 seconds—and on the other side of the surge-proof barrier a low density paper strip, approximately 0.3 to 0.4 density with a porosity of the order of 100 cc. in 115 seconds.

This least dense, long-fibered sheet is purposely arranged next to the cathode of the capacitor structure. Thus a structure when properly impregnated with an electrolyte scintillating at 465 volts at 25 degrees C., and with anodes formed for a working voltage rating of 450 volts, will withstand 10,000 surges of 600 volts applied to 2,500 ohms with the surges limited to 15 seconds duration, which is the approximate heating time of the cathode in the receiving tube of a radio set. The characteristics of such a capacitor vary very little from the original value over such a large number of surge cycles. These surge cycles consist of the capacitor being subjected to its normal working voltages of 450 volts peak after the application of the surge condition for approximately 15 seconds. The capacitor is then allowed to remain idle—i. e., without voltage for 2½ minutes before the cycle is repeated. This arrangement of spacers was found on test to stand up on successive surges well over the working voltage of the capacitor, when these surges were applied repeatedly and at sufficiently spaced intervals, such that the surge current did not unduly heat the capacitor.

Of the three elements making up the surge-proof barrier of this invention, the characteristics of the middle sheet are most essential, while the characteristics of the two outside sheets may be varied considerably without effecting appreciably the overall performance of the structure. The surge-proof paper herein described is commercially successful because, while possessing the desirable density, low porosity, and surge performance, it is capable of being easily and sufficiently impregnated with the electrolyte to effectively prevent the loss of capacitance and produce units of uniform and lower power factor.

This invention, then, overcomes the inherent difficulties which have been present in earlier forms of dry electrolytic capacitors, and accomplishes this without resorting to the use of Cellophane sheets or cellulose acetate treated paper, both of which are not commercial in that they will not produce capacitors of uniform characteristics.

Having now described my invention, I claim:

1. A dry electrolytic capacitor comprising an anode, a cathode and all paper surge-proof spacing means for said anode and cathode consisting in an absorbent sheet of paper having a density approximating 0.8 and a porosity on the order of 100 cubic centimeters in 630 seconds, and a plurality of sheets of capacitor tissue having densities within the range of 0.3 to 0.6 disposed on either side thereof, one of said sheets of capacitor tissue sheets being composed of matted short-fibered strips of wood pulp having a density on the order of 0.57.

2. Surge-proof spacing means for anode and cathode in a dry electrolytic capacitor consisting in a strip of paper of the order of 0.8 density and a porosity of 100 cubic centimeters in 630 seconds, a matted short-fibered strip of wood-pulp paper having a density of 0.57 and a porosity of 100 cubic centimeters in 120 seconds disposed on one side of said first mentioned strip adjacent the anode, and another strip of paper of 0.3 to 0.4 density and a porosity of the order of 100 cubic centimeters in 115 seconds disposed on the other side of said first mentioned paper strip adjacent the cathode.

FRANK S. DUNLEAVEY.